United States Patent

Wu

(10) Patent No.: US 8,664,145 B2
(45) Date of Patent: Mar. 4, 2014

(54) METHODS OF PREPARING AN AROMATIZATION CATALYST

(75) Inventor: An-Hsiang Wu, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 312 days.

(21) Appl. No.: 12/617,483

(22) Filed: Nov. 12, 2009

(65) Prior Publication Data

US 2010/0160150 A1 Jun. 24, 2010

Related U.S. Application Data (60) Provisional application No. 61/140,306, filed on Dec. 23, 2008, provisional application No. 61/140,303, filed on Dec. 23, 2008, provisional application No. 61/140,314, filed on Dec. 23, 2008.

(51) Int. Cl.
| | | |
|---|---|---|
| *B01J 29/04* | (2006.01) | |
| *B01J 29/87* | (2006.01) | |
| *B01J 21/00* | (2006.01) | |
| *B01J 23/00* | (2006.01) | |
| *B01J 25/00* | (2006.01) | |
| *B01J 29/00* | (2006.01) | |
| *B01J 27/06* | (2006.01) | |
| *B01J 27/128* | (2006.01) | |
| *B01J 27/13* | (2006.01) | |

(52) U.S. Cl.
USPC ............ 502/229; 502/60; 502/100; 502/230

(58) Field of Classification Search
USPC ............... 502/20–56, 66, 100, 224, 229, 230
See application file for complete search history.

(56) References Cited

U.S. PATENT DOCUMENTS

| | | |
|---|---|---|
| 3,898,173 A | 8/1975 | Hayes |
| 4,444,895 A | 4/1984 | Fung et al. |
| 4,444,896 A | 4/1984 | Fung et al. |
| 4,444,897 A | 4/1984 | Fung et al. |
| 4,447,551 A | 5/1984 | Fung et al. |

(Continued)

FOREIGN PATENT DOCUMENTS

| | | |
|---|---|---|
| EP | 0278851 A2 | 8/1988 |
| EP | 0316727 A1 | 5/1989 |

(Continued)

OTHER PUBLICATIONS

Fukunaga, Tetsuya, et al., "Halogen-promoted Pt/KL Zeolite Catalyst for the Production of Aromatic Hydrocarbons from Light Naphtha," Catal. Surv. Asia, Jun. 4, 2010, vol. 14, pp. 96-102, Springer Science+Business Media, LLC.

(Continued)

*Primary Examiner* — Jennifer Smith
(74) *Attorney, Agent, or Firm* — Rodney B. Caroll; Chad E. Walter; Conley Rose, P.C.

(57) ABSTRACT

A method of preparing a fresh catalyst comprising impregnating a metal into a catalyst support to produce an impregnated catalyst, dispersing the metal in the impregnated catalyst to produce an impregnated, dispersed catalyst, contacting the impregnated, dispersed catalyst with an activating composition to produce an impregnated, dispersed, activated catalyst, and thermally treating the impregnated, dispersed, activated catalyst to produce a fresh catalyst wherein the activating composition is in the liquid phase.

25 Claims, 1 Drawing Sheet

(56) References Cited

U.S. PATENT DOCUMENTS

| | | | |
|---|---|---|---|
| 4,467,045 A | 8/1984 | Fung | |
| 4,472,514 A | 9/1984 | Fung | |
| 4,472,515 A | 9/1984 | Fung | |
| 4,473,656 A | 9/1984 | Fung et al. | |
| 4,480,046 A | 10/1984 | Fung et al. | |
| 4,491,635 A | 1/1985 | Fung et al. | |
| 4,491,636 A | 1/1985 | Fung et al. | |
| 4,492,767 A | 1/1985 | Fung | |
| 4,493,901 A | 1/1985 | Bernard et al. | |
| 4,539,304 A | 9/1985 | Field | |
| 4,552,856 A | 11/1985 | Tauster et al. | |
| 4,595,668 A | 6/1986 | Poeppelmeier et al. | |
| 4,595,669 A | 6/1986 | Fung et al. | |
| 4,595,670 A | 6/1986 | Tauster et al. | |
| 4,634,517 A | 1/1987 | Tauster et al. | |
| 4,645,751 A | 2/1987 | McCullen et al. | |
| 4,648,960 A | 3/1987 | Poeppelmeier et al. | |
| 4,657,874 A | 4/1987 | Borghard et al. | |
| 4,678,764 A | 7/1987 | Le et al. | |
| 4,681,865 A | 7/1987 | Katsuno et al. | |
| 4,721,607 A * | 1/1988 | Haddad et al. | 423/703 |
| 4,789,655 A | 12/1988 | Travers et al. | |
| 4,810,683 A | 3/1989 | Cohn et al. | |
| 4,822,762 A | 4/1989 | Ellig et al. | |
| 4,824,816 A | 4/1989 | Trowbridge et al. | |
| 4,835,129 A | 5/1989 | Travers et al. | |
| 4,839,320 A | 6/1989 | Trowbridge et al. | |
| 4,851,380 A | 7/1989 | Van Leirsburg et al. | |
| 4,855,269 A | 8/1989 | Mohr | |
| 4,914,068 A | 4/1990 | Cross et al. | |
| 4,925,819 A | 5/1990 | Fung et al. | |
| 4,937,215 A | 6/1990 | Murakawa et al. | |
| 5,034,117 A | 7/1991 | De Bonneville et al. | |
| 5,106,798 A | 4/1992 | Fung | |
| 5,155,074 A | 10/1992 | Mohr | |
| 5,185,306 A | 2/1993 | Cohn et al. | |
| 5,196,631 A | 3/1993 | Murakawa et al. | |
| RE34,250 E | 5/1993 | Van Leirsburg et al. | |
| 5,220,108 A | 6/1993 | Hashimoto et al. | |
| 5,256,612 A | 10/1993 | Fung | |
| 5,260,238 A | 11/1993 | Murakawa et al. | |
| 5,270,272 A | 12/1993 | Galperin et al. | |
| 5,348,924 A | 9/1994 | Potter et al. | |
| 5,378,669 A | 1/1995 | Fung | |
| 5,491,119 A * | 2/1996 | Verduijn | 502/74 |
| 5,552,035 A | 9/1996 | Potter et al. | |
| 5,557,029 A | 9/1996 | Lin et al. | |
| 5,573,988 A | 11/1996 | Didillon | |
| 5,672,801 A | 9/1997 | Didillon | |
| 5,683,573 A | 11/1997 | Haizmann et al. | |
| 5,698,486 A | 12/1997 | Fung et al. | |
| 5,712,214 A | 1/1998 | Huang et al. | |
| 5,726,112 A | 3/1998 | Fung et al. | |
| 5,755,956 A | 5/1998 | Galperin et al. | |
| 5,756,414 A | 5/1998 | Huang et al. | |
| 5,763,348 A | 6/1998 | Fung et al. | |
| 5,776,849 A | 7/1998 | Fung et al. | |
| 5,792,338 A | 8/1998 | Gosling et al. | |
| 5,854,162 A | 12/1998 | Dufresne et al. | |
| 5,866,495 A | 2/1999 | Fung et al. | |
| 5,880,049 A | 3/1999 | Lacroix et al. | |
| 5,880,050 A | 3/1999 | Boitiaux et al. | |
| 5,883,031 A | 3/1999 | Innes et al. | |
| 5,898,011 A | 4/1999 | Wu et al. | |
| 5,935,415 A | 8/1999 | Haizmann et al. | |
| 5,980,731 A | 11/1999 | Kao et al. | |
| 6,034,019 A | 3/2000 | Fung et al. | |
| 6,048,814 A | 4/2000 | Capelle et al. | |
| 6,103,652 A | 8/2000 | Brunet et al. | |
| 6,110,857 A | 8/2000 | Fung et al. | |
| 6,133,183 A | 10/2000 | Capelle et al. | |
| 6,147,022 A | 11/2000 | Brunet et al. | |
| 6,190,539 B1 * | 2/2001 | Holtermann et al. | 208/139 |
| 6,191,332 B1 | 2/2001 | Duee et al. | |
| 6,277,335 B1 | 8/2001 | Capelle et al. | |
| 6,291,381 B1 | 9/2001 | Lin et al. | |
| 6,294,492 B1 | 9/2001 | Lin | |
| 6,358,400 B1 | 3/2002 | Bogdan et al. | |
| 6,380,119 B1 | 4/2002 | Grosch et al. | |
| 6,410,472 B2 | 6/2002 | Macahan et al. | |
| 6,426,052 B1 | 7/2002 | Capelle et al. | |
| 6,472,340 B2 | 10/2002 | Lin | |
| 6,593,264 B2 | 7/2003 | Lin et al. | |
| 6,600,082 B2 | 7/2003 | Le Peltier et al. | |
| 6,605,566 B2 | 8/2003 | Le Peltier et al. | |
| 6,710,002 B2 | 3/2004 | Grosch et al. | |
| 6,740,615 B2 | 5/2004 | Zhou | |
| 6,784,132 B1 | 8/2004 | Sechrist | |
| 6,790,802 B1 | 9/2004 | Sechrist | |
| 6,833,338 B2 * | 12/2004 | McDaniel et al. | 502/104 |
| 6,881,391 B1 | 4/2005 | Sechrist | |
| 6,908,873 B2 | 6/2005 | Zhou et al. | |
| 7,037,871 B1 | 5/2006 | Galperin et al. | |
| 7,074,975 B2 | 7/2006 | Braun et al. | |
| 7,153,801 B2 | 12/2006 | Wu | |
| 7,223,710 B2 | 5/2007 | Sechrist | |
| 7,312,173 B1 | 12/2007 | Yuan et al. | |
| 7,319,175 B2 | 1/2008 | Braun et al. | |
| 7,582,272 B2 | 9/2009 | Glova et al. | |
| 7,638,101 B2 | 12/2009 | Yuan et al. | |
| 7,745,675 B2 | 6/2010 | Ellis et al. | |
| 7,868,217 B2 | 1/2011 | Brown et al. | |
| 7,985,381 B2 | 7/2011 | Sun et al. | |
| 8,216,522 B2 | 7/2012 | Sun et al. | |
| 2004/0259719 A1 * | 12/2004 | Wu | 502/66 |
| 2005/0027648 A1 | 2/2005 | Knowles et al. | |
| 2010/0160147 A1 * | 6/2010 | Wu | 502/29 |
| 2010/0160150 A1 * | 6/2010 | Wu | 502/62 |
| 2010/0160702 A1 * | 6/2010 | Wu | 585/419 |
| 2010/0222202 A1 | 9/2010 | Nabozny et al. | |
| 2012/0093699 A1 | 4/2012 | Nabozny et al. | |
| 2013/0231511 A1 | 9/2013 | Wu | |
| 2013/0231512 A1 | 9/2013 | Wu | |

FOREIGN PATENT DOCUMENTS

| | | |
|---|---|---|
| EP | 0378482 A1 | 7/1990 |
| EP | 0294448 B1 | 8/1991 |
| EP | 0294477 B1 | 9/1992 |
| EP | 0334562 B1 | 3/1993 |
| EP | 0535619 A1 | 4/1993 |
| EP | 0548421 A1 | 6/1993 |
| EP | 0710502 A1 | 5/1996 |
| EP | 0872276 A1 | 10/1998 |
| EP | 0872277 A1 | 10/1998 |
| EP | 0873785 A1 | 10/1998 |
| FR | 2325289 | 4/1977 |
| WO | 9624834 A1 | 8/1996 |
| WO | 9847615 A1 | 10/1998 |
| WO | 2010075133 A1 | 7/2010 |
| WO | 2010075134 A2 | 7/2010 |
| WO | 2010075134 A3 | 7/2010 |
| WO | 2010075135 A2 | 7/2010 |
| WO | 2010075135 A3 | 7/2010 |

OTHER PUBLICATIONS

Office Action dated Aug. 5, 2011 (32 pages), U.S. Appl. No. 12/617,440, filed Nov. 12, 2009.

Foreign communication from a related application—International Search Report and Written Opinion, PCT/US2009/068268, Aug. 26, 2010, 22 pages.

Provisional Application entitled "Methods of Reactivating an Aromatization Catalyst," by An-Hsiang Wu filed Dec. 23, 2008 as U.S. Appl. No. 61/140,306.

Provisional Application entitled "Methods of Preparing an Aromatization Catalyst," by An-Hsiang Wu filed Dec. 23, 2008 as U.S. Appl. No. 61/140,314.

Provisional Application entitled "Methods of Preparing an Aromatization Catalyst," by An-Hsiang Wu filed Dec. 23, 2008 as U.S. Appl. No. 61/140,303.

(56) References Cited

OTHER PUBLICATIONS

Foreign communication from a related application—International Search Report and Written Opinion, PCT/US2009/068267, Jun. 30, 2010, 18 pages.
Foreign communication from a related application—Invitation to Pay Additional Fees, PCT/US2009/068268, May 27, 2010, 11 pages.
Fung, S.C., "Catalyst Deactivation 2001, Studies in Surface Science and Catalysis," 2001, vol. 139, pp. 399-406, Elsevier Publisher.
Foreign communication from a related application—International Search Report and Written Opinion, PCT/US2009/068266, May 25, 2010, 17 pages.
Office Action (Final) dated Feb. 13, 2012 for U.S. Appl. No. 12/617,400, filed Nov. 12, 2009, 15 pages.
Office Action dated Feb. 15, 2012 for U.S. Appl. No. 12/617,451, filed Nov. 12, 2009, 14 pages.
Office Action (Final) dated Jun. 13, 2012 for U.S. Appl. No. 12/617,440, filed Nov. 12, 2009, 19 pages.
Office Action (Final) dated May 29, 2012 for U.S. Appl. No. 12/617,451, filed Nov. 12, 2009, 17 pages.
Advisory Action dated Sep. 6, 2012, 4 pages, U.S. Appl. No. 12/617,440, filed Nov. 12, 2009.
Advisory Action dated Sep. 6, 2012 (4 pages), U.S. Appl. No. 12/617,440, filed Nov. 12, 2009.
Advisory Action dated Apr. 18, 2012 (3 pages), U.S. Appl. No. 12/617,440, filed Nov. 12, 2009.
Office Action dated Mar. 5, 2013 (19 pages), U.S. Appl. No. 12/617,440, filed Nov. 12, 2009.
Office Action (Final) dated Jul. 9, 2013 (15 pages), U.S. Appl. No. 12/617,440, filed Nov. 12, 2009.
Advisory Action dated Sep. 9, 2013 (3 pages), U.S. Appl. No. 12/617,451, filed Nov. 12, 2009.
Office Action dated Oct. 28, 2011 (32 pages), U.S. Appl. No. 12/617,451, filed Nov. 12, 2009.
Office Action dated Mar. 5, 2013 (20 pages), U.S. Appl. No. 12/617,451, filed Nov. 12, 2009.
Office Action (Final) dated Jul. 2, 2013 (13 pages), U.S. Appl. No. 12/617,451, filed Nov. 12, 2009.
Foreign communication from a related counterpart application—International Preliminary Report on Patentability, PCT/US2009/068268, Jun. 29, 2011, 12 pages.
Foreign communication from a related counterpart application—International Preliminary Report on Patentability, PCT/US2009/068266, Jun. 29, 2011, 8 pages.
Foreign communication from a related counterpart application—International Preliminary Report on Patentability, PCT/US2009/068267, Jun. 29, 2011, 9 pages.

\* cited by examiner

METHODS OF PREPARING AN AROMATIZATION CATALYST

CROSS-REFERENCE TO RELATED APPLICATION

This application claims priority to U.S. Provisional Patent Application Ser. Nos. 61/140,306, entitled "Methods of Reactivating an Aromatization Catalyst," 61/140,303 and 61/140,314, both entitled "Methods of Preparing an Aromatization Catalyst," and all of which filed Dec. 23, 2008. The subject matter of the present application is related to U.S. patent application Ser. No. 12/617,440 filed Nov. 12, 2009, published as US 2010/016147 A1, entitled "Methods of Reactivating an Aromatization Catalyst" and U.S. patent application Ser. No. 12/617,451 filed Nov. 12, 2009, published as US 2010/0160702 A1, entitled "Methods of Preparing an Aromatization Catalyst." filed concurrently herewith. Each of the above-identified applications is hereby incorporated herein by reference in its entirety for all purposes.

FIELD

The present disclosure relates to aromatization of hydrocarbons with an aromatization catalyst. Specifically, the disclosure relates to methods of preparing an aromatization catalyst.

BACKGROUND

The catalytic conversion of hydrocarbons into aromatic compounds, referred to as aromatization, is an important industrial process used to produce fundamental building block chemicals on which a large portion of the chemical industry is based. The aromatization reactions may include the dehydrogenation, isomerization, and hydrocracking of the hydrocarbons. These reactions are generally conducted in one or more aromatization reactors containing aromatization catalysts. These catalysts may increase the selectivity to desired aromatics, and/or the conversion rates of the reactions to the desired aromatic compounds. Given their commercial importance, an ongoing need exists for improved methods of preparing aromatization catalysts with high selectivity and conversion.

The activity of these catalysts may degrade over time during their use in an aromatization process. For example, the catalysts may be poisoned by the presence of contaminants thus degrading their activities. Continued use of the catalyst may result in a catalyst that no longer efficiently catalyzes a user-desired process, termed a spent catalyst. An ongoing need exists for fresh catalysts which retain their conversion rates and/or selectivity while under aromatization conditions.

SUMMARY

Disclosed herein is a method of preparing a fresh catalyst comprising impregnating a metal into a catalyst support to produce an impregnated catalyst, dispersing the metal in the impregnated catalyst to produce an impregnated, dispersed catalyst, contacting the impregnated, dispersed catalyst with an activating composition to produce an impregnated, dispersed, activated catalyst, and thermally treating the impregnated, dispersed, activated catalyst to produce a fresh catalyst, wherein the activating composition is in the liquid phase.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of preparing catalysts comprising impregnating a metal containing compound into a catalyst support, dispersing the metal throughout the catalyst support, and activating the catalyst with a liquid phase activating composition to provide a fresh catalyst having a catalytically active metal dispersed about the catalyst support. As used herein, the term "fresh" catalysts refer to catalysts that have not been used previously to catalyze a process. Alternatively, the catalysts may be characterized as having not been employed in a reaction zone. In an embodiment, the catalyst is an aromatization catalyst that is used to convert hydrocarbons into aromatic compounds. Generally, these conversions of hydrocarbons into aromatics are carried out in one or more aromatization reactors.

Hereinafter, the disclosure will focus on preparation of an aromatization catalyst which will be referred to generally as the "catalyst." However, it is contemplated that one of ordinary skill in the art with the benefits of this disclosure may employ similar methodologies to prepare other catalyst types.

In an embodiment, the catalysts disclosed herein comprise a catalyst support, one or more catalytically active metals, and at least two halides.

In an embodiment, the catalyst support comprises an inorganic oxide. These inorganic oxides may include bound medium and/or large pore zeolites (aluminosilicates), amorphous inorganic oxides and mixtures thereof. Large pore zeolites include, but are not limited to, L-zeolite, Y-zeolite, mordenite, omega zeolite, beta zeolite, or other types of zeolites. Amorphous inorganic oxides include, but are not limited to, aluminum oxide, silicon oxide, and titania. The catalyst support may further comprise a bonding agent such as for example silica, alumina, clays, titania, and magnesium oxide.

In an embodiment, the catalyst support comprises a medium or large pore zeolite. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to 2. The framework exhibits a negative electrovalence that typically is balanced by the inclusion of cations within the crystal such as metals, alkali metals, alkaline earth metals, or hydrogen.

In an embodiment, the catalyst support comprises an L-type zeolite. L-type zeolite catalyst supports are a subgroup of zeolitic catalyst supports. Typical L-type zeolites contain mole ratios of oxides in accordance with the following formula:

$$M_{2/n}O \cdot Al_2O_3 \cdot xSiO_2 \cdot yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite.

In an embodiment, the catalyst support comprises a bound potassium L-type zeolite, also referred to as KL zeolite. The term "KL zeolite" as used herein refers to L-type zeolites in which the principal cation M incorporated in the zeolite is potassium. A KL zeolite may be cation-exchanged or impregnated with another metal-containing compound and one or more halide-containing compounds to produce a metal impregnated, halided zeolite or a KL supported metal-halide zeolite catalyst. The catalyst support may contain up to about 95 wt % of zeolite by total weight of the support, alternatively from about 60 wt % to about 95 wt. %, alternatively from about 70 wt % to about 92 wt. %, alternatively from about 80 wt % to about 90 wt. %. Herein the weight percentage by total weight of the catalyst support refers to the weight percentage of the component based on the final weight of the catalyst support after all of the catalyst preparation steps.

In an embodiment, the catalyst comprises one or more catalytically active metals. Examples of such metals include without limitation Group IB transition metals and Group VIII transition metals of the Periodic Table such as iron, cobalt, nickel, ruthenium, rhodium, palladium, osmium, iridium, platinum, gold, silver, copper, or combinations thereof. The metal or metals are added to the catalyst support by any suitable method, such as via impregnation with a solution of a metal-containing compound. Such metals may undergo an activation step, for example a change in oxidation state, prior to dispersing the metal about the catalyst support. Alternatively, such metals may be activated by contact with one or more other compounds (e.g., an activating composition), for example with one or more halide-containing compounds as described herein. In some embodiments the addition of the metal-containing compound is assisted by the addition of any suitable chlorine-containing compound. For example, an organic ammonium chlorine-containing compound can be used.

In an embodiment, the metal comprises platinum (Pt). The Pt may be added to the catalyst support by any suitable method, such as via impregnation with a solution of a Pt-containing compound. The Pt-containing compound may be any decomposable Pt-containing compound. Examples of such compounds include without limitation ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, tetraammineplatinum (II) nitrate, or combinations thereof.

In an embodiment, the metal may be present in the catalyst in an amount from about 0.1 wt. % to about 50 wt. % by total weight of catalyst, alternatively from about 0.1 wt. % to about 10 wt. %, alternatively from about 0.2 wt. % to about 5 wt. %, alternatively from about 0.3 wt. % to about 3 wt. %, alternatively from about 0.3 wt. % to about 2 wt. %.

In an embodiment, the catalyst comprises at least two halides. Examples of suitable halides include chloride, fluoride, bromide, iodide, or combinations thereof. In an embodiment, the catalyst comprises chloride. The halide may be added to the catalyst support by any suitable method, such as via impregnation, contacting with oxygen and a halogen-containing compound, or combinations of these methods.

In an embodiment, chloride may be added to the catalyst support by contacting the catalyst support with a chlorine-containing compound in the presence of oxygen. In another embodiment, the chloride may be added to the catalyst support by contacting the catalyst support with a dispersing composition containing a chlorine-containing compound in the presence of oxygen. Such processes involving chlorine-containing compounds and oxygen are generally referred to as oxychlorination. The chlorine-containing compound may be in the solid phase, liquid phase, gas phase, or combinations thereof. Examples of chlorine-containing compounds suitable for use in this disclosure include without limitation hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, or combinations thereof. In some embodiments, the chlorine-containing compound may be hydrochloric acid, carbon tetrachloride, tetrachloroethylene, or combinations thereof.

The chlorine-containing compound may also be an organic chlorine-containing compound such as the organic ammonium chlorine-containing compounds represented by the general formula $N(R)_4Cl$, where R represents a hydrogen or a substituted or unsubstituted carbon chain molecule having 1 to 20 carbon atoms wherein each R may be the same or different. In an embodiment, R is methyl, ethyl, propyl, butyl, or combinations thereof. Alternatively R is methyl. Specific examples of suitable organic ammonium chlorine-containing compounds include ammonium chloride, tetramethylammonium chloride (TMAC), tetraethylammonium chloride, tetrapropylammonium chloride, tetrabutylammonium chloride, methyltriethylammonium chloride, or combinations thereof. Alternatively, the organic ammonium chlorine-containing compound is TMAC.

The organic ammonium chlorine containing compound may comprise at least one hydrochloric acid and at least one ammonium hydroxide represented by the formula $N(R')_4OH$, where R' is hydrogen or a substituted or unsubstituted carbon chain molecule having from 1 to 20 carbon atoms wherein each R' may be the same or different. In an embodiment, R' is methyl, ethyl, propyl, butyl, or combinations thereof. Alternatively R' is methyl. Examples of suitable ammonium hydroxides represented by the formula $N(R')_4OH$ include ammonium hydroxide, tetraalkylammonium hydroxides such as tetramethylammonium hydroxide, tetraethylammonium hydroxide, tetrapropylammonium hydroxide, tetrabutylammonium hydroxide, or combinations thereof.

Chloride may be present in the catalyst in an amount of from about 0.1 wt. % to about 5 wt. % by total weight of the catalyst, alternatively from about 0.2 wt. % to about 3 wt. %, alternatively from about 0.3 wt. % to about 2 wt. %.

In an embodiment, the catalyst comprises fluoride. Fluoride may be added to the catalyst support by any suitable method, such as via contacting the catalyst support with a fluorine-containing compound which is generally referred to as fluoridation. Examples of fluorine-containing compounds suitable for use in this disclosure include without limitation tetramethylammonium fluoride (TMAF), ammonium fluoride ($NH_4F$ or AF), or combinations thereof.

The fluorine-containing compound may be an organic ammonium halide compound and may comprise one or more compounds represented by the general formula $N(R)_4F$, where R represents a hydrogen or a substituted or unsubstituted carbon chain molecule having from 1 to 20 carbon atoms wherein each R may be the same or different. In an embodiment, R is methyl, ethyl, propyl, butyl, or combinations thereof. Alternatively R is methyl. Examples of suitable organic ammonium compound include without limitation ammonium fluoride, tetramethylammonium fluoride, tetraethylammonium fluoride, tetrapropylammonium fluoride, tetrabutylammonium fluoride, methyltriethylammonium fluoride, or combinations thereof.

The organic ammonium halide compound may also comprise at least one hydrofluoric acid and at least one ammonium hydroxide represented by the formula $N(R')_4OH$, where R' is hydrogen or a substituted or unsubstituted carbon chain molecule having from 1 to 20 carbon atoms wherein each R' may be the same or different. In an embodiment, R' is methyl, ethyl, propyl, butyl, or combinations thereof. Alternatively R' is methyl. Examples of organic ammonium hydroxides suitable for use in this disclosure include without limitation ammonium hydroxide, tetraalkylammonium hydroxides such as tetramethylammonium hydroxide, tetraethylammonium hydroxide, tetrapropylammonium hydroxide, tetrabutylammonium hydroxide, or combinations thereof.

Fluoride may be present in the catalyst in an amount of from about 0.1 wt. % to about 10 wt % by total weight of catalyst, alternatively from about 0.2 wt. % to about 5 wt. %, alternatively from about 0.3 wt. % to about 3 wt. %, alternatively from about 0.6 wt. % to about 2 wt. %.

In various embodiments, the catalyst comprises Pt, and chloride (Cl) in an atomic ratio of Pt:Cl from about 1.0:0.1 to about 1.0:10, alternatively from about 1.0:0.2 to about 1.0:5.0, alternatively from about 1.0:0.3 to about 1.0:3.0.

Figure 1:
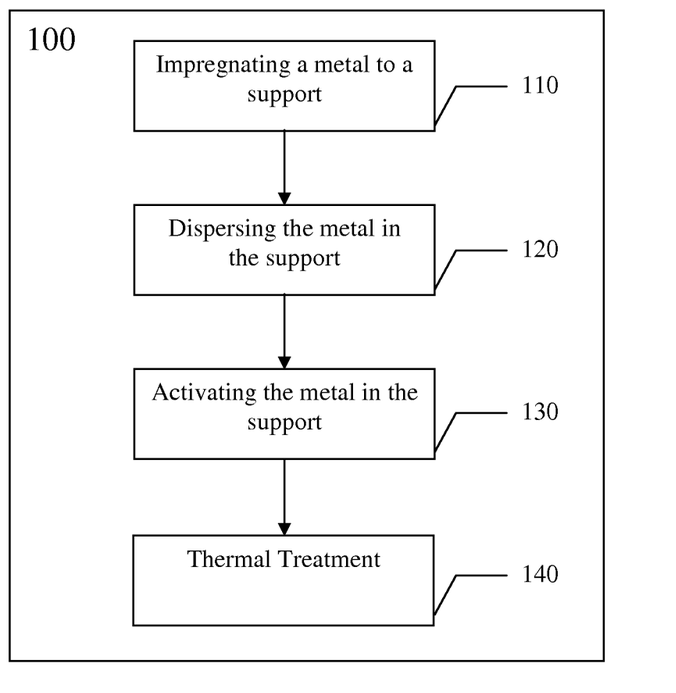
FIG. 1 is a flowchart of a method of preparing a fresh aromatization catalyst.

FIG. 1 is a flowchart of an embodiment of a method of preparing a fresh catalyst. Referring to FIG. 1, a method 100 of preparing a fresh catalyst may initiate with the impregnation of a catalyst support with a metal-containing compound, Block 110, both of which may be of type that has been described previously herein. The method may then proceed to dispersing the metal throughout the catalyst support, Block 120, to produce an impregnated dispersed catalyst. The metal may be dispersed via contact with one or more dispersing compositions. The metal may be dispersed throughout the catalyst support, in one or more layers of the catalyst (e.g., a skin layer), about the periphery of the catalyst support, or various combinations thereof, and such dispersion may be uniform or non-uniform. The material may be further processed by activating the metal in the catalyst support, Block 130, to produce an impregnated, dispersed, activated catalyst. In an embodiment, the metal may be activated by contact with one or more, alternatively two or more, halide-containing compounds. The method may conclude with a thermal treatment to produce the catalyst, Block 140.

In an embodiment, the catalyst support comprises KL zeolite and the metal comprises Pt. The KL zeolite containing catalyst support may be pretreated prior to impregnating the catalyst support, Block 110. For example, the catalyst support may be dried under stationary or flowing gas. Examples of suitable gases include hydrogen, oxygen, air, helium, nitrogen, argon, or combinations thereof. The pretreatment of the catalyst support may be carried out for a period from about 1 minute to about 100 hours, alternatively from about 0.1 hours to about 50 hours, alternatively from about 1 hour to about 24 hours. The pretreatment of the catalyst support may be performed at temperatures in a range of from about 25° C. to about 1000° C., or from about 50° C. to about 900° C., or from about 100° C. to about 800°, and at a pressure in a range of from about 0 psi to about 1000 psi, or from about 0 psi to about 900 psi, or from about 0 psi to about 800 psi. Hereinafter exposure of the composition to the conditions described in the pretreatment will be referred as drying the composition.

Impregnation of the catalyst support with the metal-containing compound, Block 110, may be carried out via any method known to one of ordinary skill in the art such as incipient wetness, aqueous impregnation, organic solvent impregnation, ion exchange, or combinations thereof. In an embodiment, impregnation of a catalyst support containing KL zeolite with platinum, Block 110, may be carried out via incipient wetness impregnation with an aqueous solution of a Pt-containing compound. In some embodiments, it may be desirable to age the impregnated catalyst. This aging can be performed at temperatures from about subambient to about 200° C., at pressures from about ambient to about 500 psig for periods of time from about 1 minute to about 10 days and under conditions where the impregnated solid is stationary or moving. Ambient conditions are defined as environmental temperature at atmospheric pressure. In some embodiments, it may be desirable to calcine the impregnated catalyst. The calcination generally occurs in the presence of a gas, which can be air, oxygen, nitrogen, hydrogen, or any inert gas, or mixtures thereof. As an example, it may be desirable to calcine in the presence of a gas comprising nitrogen and/or oxygen, for example enriched air or diluted air, such that it contains from about 0.1 vol % to about 100 vol % oxygen, alternatively from about 1 vol % to about 80 vol % oxygen, alternatively from about 5 vol % to about 60 vol % oxygen. In an embodiment, the gas is a mixture of air and nitrogen, for example having a volume ratio air to nitrogen of from about 1:1 to about 1:3. The calcination step can be performed at temperatures from about 50° to about 600° C., alternatively from about 160° to about 550° C., alternatively from about 275° to about 500° C.; under pressures from ambient to 500 psig; for periods of time from about 1 minute to about 100 hours; under conditions where the gas is stationary or moving; and under conditions were the impregnated catalyst is stationary or moving. During the calcination step, the temperature is increased from ambient temperature in a controlled manner, preferably through a series of temperature increases followed by temperature hold periods. The calcining step may be carried out in any suitable calcining equipment, for example a rotary calciner or a belt conveyed calciner.

The Pt-containing compound may be of the type previously described herein. After impregnation, the catalyst support impregnated with the Pt-containing compound may be dried as described previously herein.

The method may then proceed to Block 120 wherein the metal deposited onto the catalyst support during the impregnation with the metal-containing compound is dispersed by contacting the impregnated catalyst with a dispersing composition to produce an impregnated, dispersed catalyst. The dispersing composition may comprise a chlorine-containing compound of the type previously described herein and oxygen. For example, the dispersing composition may comprise hydrochloric acid and oxygen. Contacting of the impregnated catalyst with a dispersing composition containing a chlorine-containing compound and oxygen may be referred to as oxychlorination. In some embodiments, the dispersing composition comprises carbon tetrachloride and oxygen. In other embodiments, the dispersing composition comprises tetrachloroethylene and oxygen. Contacting of the impregnated catalyst with the dispersing composition may be carried out over a time period of from about 0.5 hour to about 50 hours, alternatively from about 1 hour to about 20 hours, alternatively from about 2 hours to about 10 hours at a temperature in the range of from about 25° C. to about 1000° C., alternatively from about 50° C. to about 900° C., alternatively from about 100° C. to about 800° C., alternatively from about 200° C. to about 400° C., alternatively from about 400° C. to about 800° C. When oxygen is used the oxygen concentration used is from about 0.01 mol % to about 20 mol %, alternatively from about 1 mol % to about 18 mol %, alternatively from about 5 mol % to about 15 mol %, alternatively from about 8 mol % to about 12 mol %. After the impregnated catalyst is dispersed by contacting the impregnated catalyst with a dispersing composition containing a chlorine-containing compound and oxygen the resulting impregnated, dispersed catalyst may have chloride levels of from about 0.1 wt. % to about 5 wt. % by total weight of the catalyst, alternatively from about 0.2 wt. % to about 3 wt. %, alternatively from about 0.3 wt. % to about 2 wt. %. After dispersion, the resultant composition is an impregnated, dispersed, catalyst. After dispersion, the impregnated, dispersed, catalyst may optionally be thermally treated to dry and/or calcine the composition under conditions described previously herein.

In an alternative embodiment, the impregnated catalyst is contacted with a dispersing composition comprising a chorine-containing compound of the type described herein and oxygen in the presence of water. When water is used, the water to HCl mole ratio ($H_2O$:HCl) used is from about 0.01:1 to about 10:1, alternatively from about 0.5:1 to about 5:1, alternatively from about 1:1 to about 3:1. When chorine-containing compounds are used other than HCl are used, the $H_2O$:HCl mole ratio is calculated based on the equivalent amount of HCl generated in the presence of the impregnated catalyst.

In an embodiment, a weak base may be included during the dispersing of the metal on the impregnated catalyst to neutralize free acids that may be present. An example of weak base suitable for use in this disclosure includes without limitation ethylene diamine (EDA). The Pt-impregnated Cl-containing KL zeolite may be staged as previously described herein.

The method may then proceed to Block 130 wherein the impregnated, dispersed, catalyst is activated by contacting with an activating composition. In an embodiment, a Pt-impregnated Cl-containing KL zeolite is activated by contacting with an activating composition. The activating composition may be a fluorine-containing composition of the type described previously herein. Contacting of the impregnated, dispersed, catalyst with a fluorine-containing composition is referred to as fluoridation. In an embodiment, the activating composition comprises an organic ammonium halide compound. Alternatively, the activating composition comprises TMAF. Commercially available preparations of TMAF may be used or the TMAF may be prepared using any suitable method. For example, the TMAF may be prepared by mixing a tetramethylammonium hydroxide (TMAOH) with an acidic fluorine-containing compound, which may be in the gas, liquid, or solid phase such as hydrofluoric acid (HF). In an embodiment, the activating composition is in the liquid phase. A weak base may be included during the activation of the metal to neutralize free acids that may be present. Contacting of the impregnated, dispersed, catalyst with an activating composition may be carried out via any suitable method such as incipient wetness, aqueous impregnation, organic solvent impregnation, ion exchange, or combinations thereof. In an embodiment, a Pt-impregnated chlorine-containing KL zeolite catalyst is contacted with an aqueous solution of a fluorine-containing compound via incipient wetness impregnation. After the impregnated, dispersed catalyst is contacted with an activating composition the resultant composition is an impregnated, dispersed, activated catalyst. In some specific embodiments, the resultant composition is a Pt-impregnated Cl and F-containing KL zeolite.

The method may conclude with thermal treatment of the impregnated, dispersed, activated catalyst, Block 140. In an embodiment, the thermal treatment comprises calcining the resulting material in a temperature range of from about 25° C. to about 1000° C., alternatively from about 50° C. to about 900° C., alternatively from about 100° C. to about 800° C., alternatively from about 200° C. to about 700° C., alternatively from about 300° C. to about 600° C. The calcination is normally carried out at ambient pressures, but may optionally be carried out at a pressure in the range of from about 0 psi to about 1000 psi, or from about 1 psi to about 500 psi, or from about 2 psi to about 50 psi. The calcination may be carried out for a period of time from about 1 minute to about 40 hours, or from about 2 hours to about 20 hours, or from about 3 hours to about 15 hours, or from about 5 hours to 10 hours. The thermal treatment may be carried out utilizing stationary or flowing gas (i.e. hydrogen, oxygen, air, helium, nitrogen, argon, etc). For example, the activating may be carried out in a flowing gas comprising nitrogen and/or oxygen, air, nitrogen diluted air, or combinations thereof. The ratio of air to nitrogen may be selected by one of ordinary skill in the art to meet the needs of the process. If the calcination process is be carried out in the presence of oxygen, the oxygen concentration may be from about 0.01 mol % to about 20 mol % alternatively from about 0.1 mol % to about 15 mol % alternatively from about 0.2 mol % to about 10 mol % alternatively from about 0.5 mol % to about 5 mol % alternatively from about 1 mol % to about 3 mol %. Upon completion of the process of FIG. 1, a fresh catalyst is provided and recovered.

In an embodiment, the fresh catalyst may be used in process for reforming a hydrocarbon, for example aromatization, isomerization, dehydrogenation, and combinations thereof. For example, such a process could include contacting a hydrocarbon stream with a fresh catalyst as described herein under suitable reaction conditions for aromatization of hydrocarbons, for example a temperature in the range of about 800° F. to about 1050° F. In an embodiment, hydrogen is recovered as a product from the reforming process. In an embodiment, the catalyst comprises a composition made according to one of the methods described herein.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

In the following examples, the catalysts used were aromatization catalysts of the type described previously herein. Specifically, the catalysts were characterized as KL zeolite containing catalyst supports with about 0.5% to about 1.5% Pt. Unless otherwise indicated, fresh catalyst samples were prepared using the following general procedure: (i) impregnating the catalyst support with Pt to form an impregnated catalyst; (ii) dispersing the Pt in the impregnated catalyst with a dispersing composition containing a chlorine-containing compound to form a impregnated, dispersed catalyst; (iii) contacting the impregnated, dispersed catalyst with a liquid phase activating composition comprising a fluorine-containing compound to produce the impregnated, dispersed, activated catalyst; and (iv) thermally treating the impregnated, dispersed, activated catalyst to produce the fresh catalyst, which is disclosed in detail herein.

The samples produced in the following examples were then tested for their fouling rates which correlate to their activities by y=fx+initial $T_{60}$ wherein y is temperature, f is the fouling rate, x is time, and initial $T_{60}$ is the initial start of run temperature.

The fouling rate of the catalyst samples was determined by plotting the temperature required to maintain a total yield of benzene plus toluene at 60 wt. % over time at standard test conditions. The fouling rates were then determined from the calculated slope fit to the resulting temperature data. In each of the following examples the following standard test conditions were utilized, the reactivated catalysts were ground, sieved to about 20 to 40 mesh, and 1 gram was placed in a reactor comprising a ¼ inch OD stainless steel reactor vessel in a temperature controlled furnace. After reducing the catalyst under flowing hydrogen, a feed stream of aliphatic hydrocarbon and hydrogen was introduced to the reactor vessel at a feed rate of 22 mL/min; a pressure of 50 psig; a $H_2$:Hydrocarbon mole ratio of 3:1, a liquid hourly space velocity of 9 $hr^{-1}$, LHSV to obtain performance data. The aliphatic hydrocarbon contained the following weight percentages of normal paraffins and isoparaffins; about 8 wt % $C_8$ paraffins, about 28 wt % $C_7$ paraffins, and about 62 wt % $C_6$ paraffins. The reactor effluent composition was analyzed by gas chromatography to indicate the amount of benzene and toluene. In each of the following examples the catalyst preparation procedure, preparation parameters, and/or the process condition variations are evaluated by the effects observed in the final catalyst performance by determining and analyzing of catalyst fouling rates (° F./day); and initial start of run temperature (° F.) (also denoted initial $T_{60}$). Other parameters tabulated include time on-stream (hr) (also denoted TOS); and end of run temperature (° F.) (denoted final $T_{60}$); and others as indicated, tabulated, and collectively referred to as the results.

Example 1

A three step process was investigated as a method of preparing fresh catalyst. The process involved an impregnation step followed by two steps, an oxychlorination and a fluoridation step. The effect of selecting various fluorine-containing compounds for the fluoridation step and the flow conditions used during fluoridation were investigated.

Four samples were prepared from a silica bound KL zeolite catalyst support previously calcined at about 250° C. for about 2 hours. An impregnating solution was prepared comprising 6.75 g of water, and 4.65 g of a solution containing 1 g of tetraammineplatinum (II) chloride, 0.50 g of ammonium chloride, and 18.5 g of water. Then, 11.4 g of the impregnating solution was added to 25.5 g of silica bound KL zeolite by incipient wetness impregnation and allowed to stand for about 4 hours. The sample was then heat treated at about 538° C. for about an hour. The resulting material weighted 25.29 g and contained 0.51 wt % Pt, and 0.49 wt % Cl.

These samples were then dispersed by oxychlorination through exposure to air (at about 200 ml/min) and nitrogen (about 200 ml/min) the nitrogen having been directed through a bubbler of an about 37 wt % aqueous HCl solution for about 4 hours at about 525° C. Then the HCl bubbler was then removed and the air and nitrogen flow continued, each at 200 ml/min. The temperature was then reduced to about 365° C. After about 2 hours the samples were cooled and recovered. A portion of the sample was set aside, and designated Sample 1. The fluoridation step was carried out by taking 6.2 g of the oxychlorinated sample and contacting each sample with 2.8 g of a TMAF solution. For samples designated 2 and 3, the TMAF solution was prepared from 21.8 g of TMOH.$6H_2O$, 5 g of an about 48 wt % HF solution, and 93.2 g of water. For the sample designated Sample 4, the TMAF solution was a solution of 4.50 g of $(NH_4)F$ in 95.5 g of water. Samples 2-4 sat at ambient conditions for about 16 hours, before being heat treated for about 2 hours at about 300° C., about 360° C., and about 325° C. for Samples 2, 3, and 4, respectively. Next, the samples were heat treated for about 2 hours under either flowing air, an air/$N_2$ mixture (30 ml/min air and 120 ml/min $N_2$) or static air, as indicated in Table 1. The performance of the catalyst samples for the aromatization of light naphtha was evaluated as described and the results are tabulated in Table 1.

TABLE 1

| Sample # | F-containing compound | Calcination Mode | Calcination Gas | Calcination Temp | Initial $T_{60}$ (° F.) | TOS (hr) | Final $T_{60}$ (° F.) | Fouling (° F./day) |
|---|---|---|---|---|---|---|---|---|
| 1 | none | n/a | n/a | n/a | 932 | 19 | 948 | 22.1 |
| 2 | TMAF | Flow | Air/$N_2$ | 300° C. | 916 | 90 | 920 | 1.3 |
| 3 | TMAF | Static | Air | 360° C. | 924 | 69 | 946 | 7.6 |
| 4 | AF | Static | Air | 325° C. | 966 | 18 | 975 | 13.3 |

Referring to Table 1, using an activation composition containing TMAF resulted in a lower fouling rate for these fresh catalysts samples when compared to using an activation composition containing $(NH_4)F$ as the fluorine-containing compound.

Example 2

The effect of varying the conditions of the oxychlorination step during preparation of a fresh catalyst was investigated. The details of Examples 1-4 along the details of the conditions for these samples are tabulated in Table 2. The samples which were previously calcined at about 250° C. for about 2 hours were impregnated with a solution of ammonium tetrachloroplatinate and an added chorine containing compound by incipient wetness. The added chorine containing compounds (ACCC) are $NH_4Cl$ for Samples 1-4, TMAOH for Samples 5-7, and TMAC for Samples 8-9.

Samples 5-7, were prepared by incipient wetness impregnation of 22.75 grams of a silica bound KL zeolite catalyst support with a solution prepared by dissolving 0.20 g of tetraammineplatinum (II) chloride, 4.90 g of an about 25 wt % solution of TMAOH, and 4.9 g of water. The material was then allowed to stand for an hour, and then was dried at 105° C. for 3 hours at ambient pressure and heat treated at 350° C. for 2 hours. The resulting impregnated catalyst weighed about 22.9 g.

Sample 5 was prepared by fluorination of 6.2 grams of the previously prepared impregnated catalyst with 2.8 g of a TMAF solution produced from 44 g of an about 25 wt % aqueous solution of TMAH, 30 g of an about 8 wt % aqueous solution of HF, and 26 g of water. The material was allowed to stand for about 20 hours, dried in air at about 105° C. and ambient pressures for about 8 hours, followed by thermal treatment at about 350° C. for about 2 hours. The resulting impregnated, activated catalyst weighed 6.22 g.

Sample 6 was prepared by dispersing of 11.72 g of the same impregnated catalyst by oxychlorination through exposure to air (at about 100 ml/min) and nitrogen (about 100 ml/min) the nitrogen having been directed through a bubbler of an about 37 wt % aqueous HCl solution for about 1 hour at about 525° C. Then the HCl bubbler was then removed, and the air and nitrogen flow continued while the temperature was reduced to about 350° C. After about 2 hours the samples were cooled and recovered. A portion of the sample was set aside, and designated Sample 6.

Sample 7 was prepared by fluorination of 6.2 grams of Sample 6 by the same process used to prepare Sample 5. The performance of the catalyst samples for the aromatization of light naphtha as described previously was evaluated and the results are tabulated in Table 2.

oxychlorination of the 5 g of the material by exposure to air (at about 200 ml/min) and nitrogen (about 200 ml/min) the nitrogen having been directed through a bubbler of an about 37 wt % aqueous HCl solution for about 6 hours at about 520° C. Then the HCl bubbler was removed, and the air and nitrogen flow continued as the samples were allowed to cool as described in Example 1. The resulting impregnated, dispersed catalyst weighed 5.01 g. This material was then impregnated with 2.5 g of an about 20 wt % aqueous solution of TMAF, and then allowed to sit for 16 hours. After impregnation with the activating composition the impregnated, dispersed, activated catalyst was dried at about 105° C. for about 8 hours, and then thermally treated at about 375° C. for about 2 hours. Both in the presence of air at ambient pressure. The resulting material weighted 5.0 g and contained 0.50 wt % Pt.

Sample 9 was prepared by a method identical to Sample 8, with the exception that after the catalyst support was impregnated with the metal containing compound and allowed to sit for about 20 hours and then dried in a vacuum oven at a

TABLE 2

| Sample # | Metal Impregnation ACCC | Drying at | 1st Calcination Temp (° C./hr) | Pt dispersion | activating composition | 2nd Calcination Temp/time (° C./hr) | Initial $T_{60}$ (F.) | TOS (hr) | Final $T_{60}$ (F.) | Fouling (F./day) |
|---|---|---|---|---|---|---|---|---|---|---|
| 1 | NH$_4$Cl | ambient | 538° C./6 hr | Oxychlorination | none | none | 932 | 19 | 948 | 22.1 |
| 2 | | | 538/6 | | TMAF | 300° C./2 hr | 916 | 90 | 920 | 1.3 |
| 3 | | | 538/6 | | TMAF | 360/2 | 924 | 69 | 946 | 7.6 |
| 4 | | | 538/6 | | AF | 325/2 | 966 | 18 | 975 | 13.3 |
| 5 | TMAOH | | 350/2 | none | TMAF | 350/2 | 1007 | n/a | n/a | n/a |
| 6 | | | 350/2 | Oxychlorination | none | none | 992 | 24 | 1063 | n/a |
| 7 | | | 350/2 | nation | TMAF | 350/2 | 934 | 43 | 937 | 1.9 |

The results demonstrate that the impregnating compositions as listed TMAC, NH$_4$Cl, TMAOH display an increased fouling rate. Finally, the use of TMAF as the activating composition resulted in lower fouling rate than when AF was used.

Example 3

The effect of vacuum drying after the metal impregnation and fluoridation in the preparation of fresh catalyst was investigated. Sample 8 was prepared by incipient wetness impregnation of 11 grams of silica bound KL zeolite catalyst support which were previously calcined at about 250° C. for about 2 hours. This catalyst support was impregnated with a solution prepared from 0.10 g of tetraammineplatinum (II) chloride (TAPC), 0.10 g of TMAC, and 5 g of water. The impregnated catalyst was allowed to sit at ambient conditions for about 20 hours; was dried at about 105° C. for about 8 hours at in the presence of air at ambient pressure; and then heat treated at about 350° C. for about 2 hours in the presence of air at ambient pressure. The resulting impregnated catalyst weighed 11.18 grams and contained 0.5 wt % of platinum. This impregnated catalyst (5 g) was then dispersed via an vacuum of about 1 mmHg at about 105° C. for about 8 hours. The resulting material weighted 5.0 g and contained 0.50 wt % Pt.

Sample 10 was prepared by a method identical to Sample 9, with the exception that after the activating composition was added to the impregnated dispersed catalyst via incipient wetness and allowed to sit for about 16 hours the impregnated catalyst support was dried in a vacuum oven at a vacuum of about 1 mmHg at about 105° C. for about 4 hours. The resulting material weighted 5.0 g and contained 0.49 wt % Pt.

The performance of the catalyst samples was evaluated and the results are tabulated in Table 3.

TABLE 3

| Sample | 1st Drying 105° C./8 hr | 1st Calcination | Dispersion Conditions | Activating composition | 2nd Drying 105° C./4 hr | 2nd Calcination | Initial $T_{60}$ (° F.) | TOS (hr) | Final $T_{60}$ (F.) | Fouling (F./day) |
|---|---|---|---|---|---|---|---|---|---|---|
| 8 | Ambient | 350° C./2 hr | 520° C./6 hr | TMAF | Ambient | 375° C./2 hr | 922 | 19 | 927 | 6.61 |
| 9 | Vacuum | | | | | | 916 | 42 | 916 | 0.01 |
| 10 | | | | | Vacuum | | 924 | 43 | 926 | 1.17 |

Referring to Table 3, the use of vacuum after impregnation with the metal as shown in samples 9 and 10 resulted in lower fouling rate compared to sample 8. However, the use of vacuum after impregnation with the activating composition as shown in sample 10 did not result in an improved fouling rate when compared to sample 9.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A method of preparing a fresh catalyst comprising:
impregnating a metal into a catalyst support to produce an impregnated catalyst, wherein the metal comprises iron, cobalt, ruthenium, rhodium, palladium, osmium, iridium, platinum, gold, or combinations thereof, and wherein the catalyst support comprises zeolite;
dispersing the metal in the impregnated catalyst to produce an impregnated, dispersed catalyst, wherein dispersing the metal into the impregnated catalyst comprises contacting the impregnated catalyst with a dispersing composition in a temperature range of from about 200° C. to about 1000° C., and wherein the dispersing composition comprises oxygen and a chlorine-containing compound;
contacting the impregnated, dispersed with activating composition to produce an impregnated, dispersed, activated catalyst, wherein the activating composition is in a liquid phase; and
thermally treating the impregnated, dispersed, activated catalyst to produce the fresh catalyst.

2. The method of claim 1 wherein the catalyst support comprises an L-type zeolite.

3. The method of claim 1 wherein the metal is present in an amount of from about 0.1. wt. % to about 50 wt. % by total weight of the fresh catalyst.

4. The method of claim 1 wherein impregnating the metal into the catalyst support occurs in the presence of the chlorine-containing compound.

5. The method of claim 4 wherein the chlorine-containing compound is an organic ammonium chlorine-containing compound.

6. The method of claim 1 wherein the chlorine-containing compound comprises a chlorine-containing compound represented by a general formula $N(R)_4Cl$, where R represents a hydrogen or a substituted or unsubstituted carbon chain molecule having 1 to 20 carbon atoms wherein each R may be the same or different.

7. The method of claim 1 wherein the chlorine-containing compound comprises hydrochloric acid, chlorine, carbon tetrachloride, tetrachloroethylene, chlorobenzene, methyl chloride, methylene chloride, chloroform, allyl chloride, trichloroethylene, chloramine, chlorine oxides, chlorine acids, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, or combinations thereof.

8. The method of claim 1 wherein the impregnated catalyst contacted with the dispersing composition for a period of from about 0.5 hour to about 50 hours.

9. The method of claim 1 wherein the activating composition comprises a fluorine-containing compound.

10. The method of claim 9 wherein the fluorine-containing compound comprises an ammonium halide represented by the general formula $N(R)_4F$, where R represents a hydrogen or a substituted or unsubstituted carbon chain molecule having from 1 to 20 carbon atoms wherein each R may be the same or different.

11. The method of claim 10 wherein the organic ammonium halide comprises tetramethylammonium fluoride, ammonium fluoride, tetramethylammonium fluoride, tetraethylammonium fluoride, tetrapropylammonium fluoride, tetrabutylammonium fluoride, or combinations thereof.

12. The method of claim 10 wherein the organic ammonium halide comprises at least one hydrofluoric acid and at least one ammonium hydroxide represented by the formula $N(R')_4OH$, where R' is hydrogen or a substituted or unsubstituted carbon chain molecule having from about 1 to about 20 carbon atoms wherein each R' may be the same or different.

13. The method of claim 12 wherein the ammonium hydroxide comprises, tetraalkylammonium, hydroxide, tetramethylammonium hydroxide, tetraethylammonium hydroxide, tetrapropylammonium hydroxide, tetrabutylammonium hydroxide, or combinations thereof.

14. The method of claim 9 wherein the fluorine containing compound comprises fluorine, hydrofluoric acid, or combinations thereof.

15. The method of claim 1 wherein the impregnated, dispersed catalyst is contacted with the activating composition for a period of from about 1 minute to about 1000 hours in a temperature range of from about 0° C. to about 100° C.

16. The method of claim 1 further comprising drying the impregnated catalyst; impregnated, dispersed catalyst; impregnated, dispersed, activated catalyst; or combinations thereof in a temperature range of from about 0° C. to about 250° C.

17. The method of claim 1 further comprising calcining the impregnated catalyst; impregnated, dispersed catalyst; impregnated, dispersed, activated catalyst; or combinations thereof in a temperature range of from about 25° C. to about 1000° C.

18. The method of claim 1 wherein dispersing the impregnated catalyst and/or activating the impregnated dispersed catalyst occurs in the presence of a weak base.

19. The method of claim 18 wherein the weak base comprises ethylenediamine.

20. The method of claim 1 wherein thermally treating the impregnated, dispersed, activated catalyst comprises heating in a temperature range of from about 25° C. to about 1000° C.

21. The method of claim 1 wherein the fresh catalyst comprises an aromatization catalyst.

22. The method of claim 1 wherein the metal comprises platinum.

23. The method of claim 1 wherein the chlorine-containing compound comprises hydrochloric acid, chlorine, carbon tetrachloride, tetrachloroethylene.

24. The method of claim 7, wherein the activating composition comprises a fluorine-containing compound.

25. The method of claim 24, wherein the fluorine containing compound comprises tetrmethylammonium fluoride, ammonium fluoride, tetramethylammonium fluoride, tetraethylammonium fluoride, tetrapropylammonium fluoride, tetrabutylammonium fluoride, or combinations thereof.

* * * * *